US008243897B2

(12) United States Patent
Groth

(10) Patent No.: US 8,243,897 B2
(45) Date of Patent: Aug. 14, 2012

(54) AUTOMATIC DETECTION AND NOTIFICATION OF PROXIMITY OF PERSONS OF INTEREST

(75) Inventor: Brian L. Groth, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1386 days.

(21) Appl. No.: 11/275,393

(22) Filed: Dec. 29, 2005

(65) Prior Publication Data

US 2007/0167136 A1 Jul. 19, 2007

(51) Int. Cl.
*H04M 3/42* (2006.01)
(52) U.S. Cl. ............ 379/201.01; 379/207.12; 455/414.1
(58) Field of Classification Search ............ 379/201.01, 379/207.12, 265.01–265.14; 455/567, 456.1, 455/445, 414.1
See application file for complete search history.

(56) References Cited

U.S. PATENT DOCUMENTS

| | | | | |
|---|---|---|---|---|
| 6,885,874 B2* | 4/2005 | Grube et al. | ................... | 455/520 |
| 6,912,398 B1* | 6/2005 | Domnitz | ........................ | 455/461 |
| 7,024,180 B2* | 4/2006 | Waters et al. | .............. | 455/414.1 |
| 7,403,796 B2* | 7/2008 | Silverbrook et al. | ......... | 455/557 |
| 7,848,765 B2* | 12/2010 | Phillips et al. | .............. | 455/456.3 |
| 8,023,929 B2* | 9/2011 | Mgrdechian et al. | ...... | 455/414.1 |
| 2002/0102989 A1* | 8/2002 | Calvert et al. | .................. | 455/456 |
| 2002/0115453 A1* | 8/2002 | Poulin et al. | ................... | 455/456 |
| 2004/0048605 A1* | 3/2004 | Schaefer et al. | ............ | 455/414.2 |
| 2004/0198398 A1* | 10/2004 | Amir et al. | .................. | 455/456.6 |
| 2005/0250552 A1* | 11/2005 | Eagle et al. | ..................... | 455/567 |
| 2007/0032240 A1* | 2/2007 | Finnegan et al. | .............. | 455/445 |
| 2007/0123167 A1* | 5/2007 | Lauper | .......................... | 455/41.2 |
| 2007/0124721 A1* | 5/2007 | Cowing et al. | ................. | 717/100 |
| 2008/0186164 A1* | 8/2008 | Emigh et al. | ............. | 340/539.13 |
| 2008/0288355 A1* | 11/2008 | Rosen | .............................. | 705/14 |
| 2009/0029717 A1* | 1/2009 | Bates et al. | ................. | 455/456.1 |

* cited by examiner

*Primary Examiner* — William Deane, Jr.
(74) *Attorney, Agent, or Firm* — Woodcock Washburn LLP

(57) ABSTRACT

A computing device is configured to monitor a local vicinity around a user and detect identification devices located in the vicinity. When an identification device is detected, data is read from the device and a person associated with the device is identified. One or more user applications are searched to determine if the identified person is listed in a user application. If so, a notification is provided to the user that the identified person is in the vicinity. In one implementation, a user calendar is searched to determine if the identified person is scheduled to attend an upcoming event with the user (e.g. a meeting). If so, the user is notified that the identified person is in the area and that the person is scheduled to attend an upcoming event—which is particularly identified—with the user.

24 Claims, 6 Drawing Sheets

AUTOMATIC DETECTION AND NOTIFICATION OF PROXIMITY OF PERSONS OF INTEREST

BACKGROUND

Workers use many different types of applications to organize their work tasks. One such application is a calendar application that a user can schedule meetings and tasks. However, a calendar application has some limitations on flexibility. Events can be scheduled, re-scheduled, amended or deleted by a user.

SUMMARY

A user's calendar application is compared with persons who are in proximity with the user to determine if one or more of the persons is a person of interest, i.e. a person who is scheduled to have a meeting with the user in the near future or a person who is listed in a user contact database. If so, then the user is notified of the person's presence. The user can them make use of this information by approaching the person to discuss a meeting subject or some other matter. In many cases, preparation for the meeting can be facilitated.

A directory application may also be accessed to collect and display information associated with the person of interest. For example, a user's computer may be configured to access an enterprise directory server to locate information about a detected person of interest, such as personal information, work information, contact information, a web site associated with the person, etc.

In at least one implementation, a location of a person of interest relative to the user is indicated when the person of interest is detected.

DESCRIPTION OF THE DRAWINGS

The present description references the following figures.

DETAILED DESCRIPTION

Figure 1:
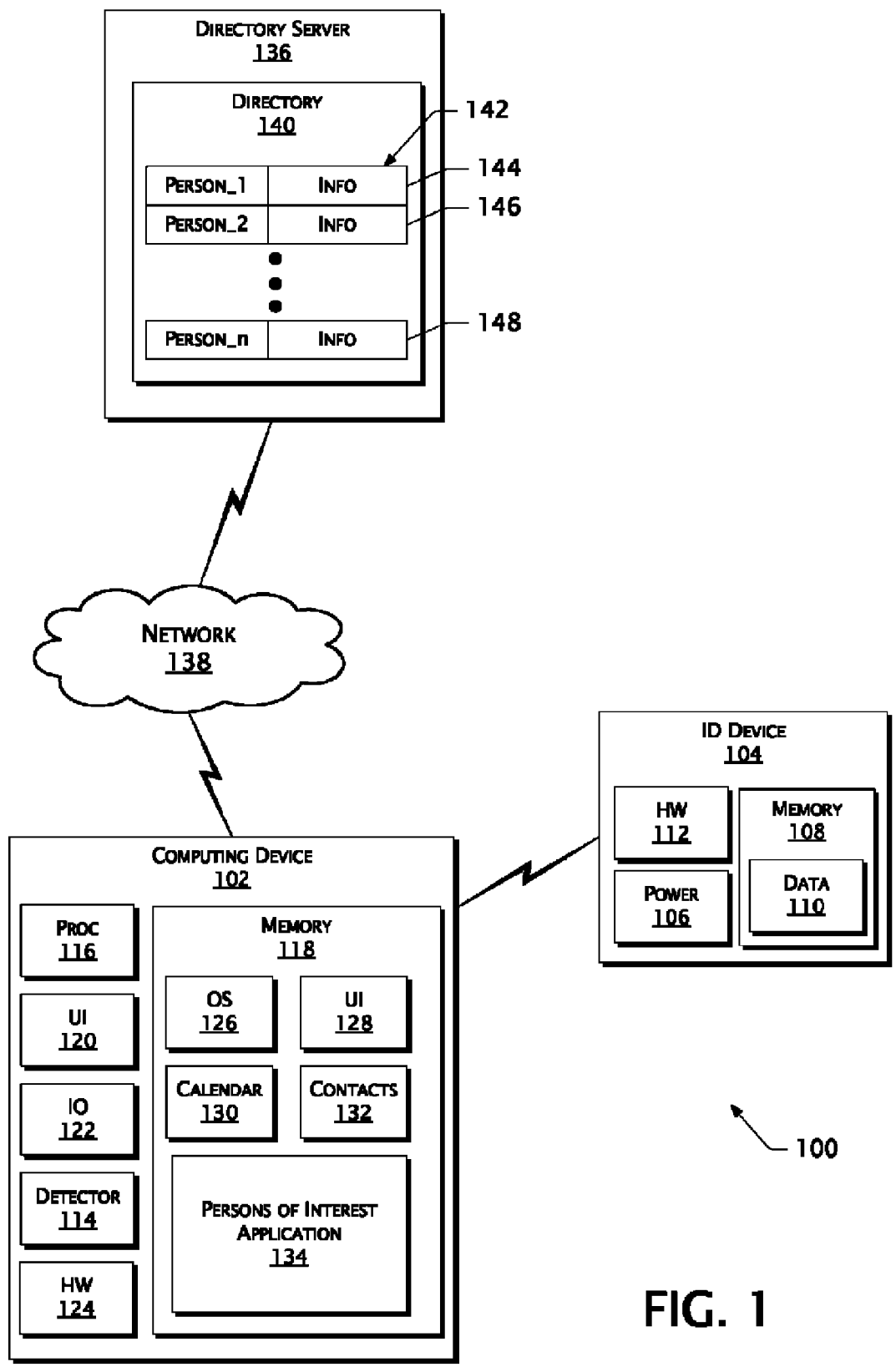
FIG. 1 is an exemplary block diagram of a system for detecting the proximity of persons of interest and notifying a user thereof.

The following description relates to techniques for automatically detecting one or more persons of interest located near a user and notifying the user of the proximity of the persons of interest. A "person of interest" as used herein means a person who is scheduled to attend an upcoming event with a user, based on a user calendar. A "person of interest" is also used herein to mean a person listed in a contacts database of a user.

Overview

A computing device associated with a user is configured to monitor a vicinity around the user to detect identification devices located in the vicinity. An identification device can be any device capable of communicating identification data to the user computing device that identifies a person associated with the identification device. Examples of identification devices include, but are not limited to, a Radio Frequency Identification (RFID) tag, a Bluetooth compatible device and an infrared (IR) device.

The identification data can be the person's name or an arbitrary value that can be used to determine an identity of the person. For example, the identification data may be an employee number that can be used as a key in a search of a directory database to identify a person associated with the employee number. Any data that can be traced to the person's identity can serve as the identification data in one or more of the described implementations.

When an identification device is detected, the identification data is read from the device and a person associated with the device is identified. One or more user applications are searched to determine if the identified person is listed in a user application. If so, then the person is a person of interest and a notification is provided to the user that the identified person of interest is in the vicinity. In at least one implementation, a user calendar application is searched to determine if the identified person is scheduled to attend an upcoming event with the user (e.g. a meeting). If so, the user is notified that the identified person is in the area and that the person is scheduled to attend an upcoming event—which is particularly identified—with the user.

In at least one other implementation, a person associated with a detected identification device is determined to be a person of interest if the person's name is associated with a user contacts application, i.e. if the detected person is listed in a user's contact database. One or more other criteria may also be used when determining if a person is a person of interest.

The techniques described herein may be used to integrate disparate systems that contain information about a person within a close physical proximity to a user. An implementation can be used for impromptu meetings with people that a user is scheduled to meet with in the near future. Many scheduled meetings can take place at any time, if only the meeting participants happen to be near each other, such as when two employees happen to meet in a company cafeteria. Alternatively, an implementation could be used during meetings where a user is sitting in a group of people and wants to know more about the people sitting in the meeting.

Exemplary System

FIG. 1 is an exemplary block diagram of a system 100 for detecting the proximity of persons of interest and notifying a user thereof. It is noted that the system 100 shown in FIG. 1 and described below is merely exemplary and that other implementations of a system may include alternate configurations that function to produce the same results described herein. Furthermore, although particular functionality is attributed to specific elements of the described system 100, it is noted that other implementations may allocate operations among system components in a different manner from that described herein without departing from the spirit and scope of the appended claims.

The system 100 includes a computing device 102 that is configured to detect an identification device 104. Although not required, the computing device 102 is typically a mobile device, such as a portable personal computer, a smart phone, a PDA (Personal Digital Assistant) or the like. The identification device 104 may be an RFID tag, an IR (Infrared) equipped device, a Bluetooth compatible computing device or the like.

Any device that can be configured to contain information sufficient to uniquely identify a person associated with the device (either directly or indirectly) and to transmit that information to the computing device 102 may serve as the identification device 104.

It is noted that although only a single identification device 104 is shown in the present example, the identification device 104 represents only one of many similar identification devices 104.

In the example described herein, the identification device 104 is an RFID tag. The identification device 104 includes a power supply 106 and memory 108. The memory 108 stores data 110 that includes at least sufficient information to uniquely identify a person associated with the identification device 104. The data 110 may only be a number that can be used to look up an entry for a person associated with the number in a remote database. Or, the data 110 may include a name of the person associated with the identification device 104. In addition to the data used to identify a person associated with the identification device, the data 110 may also describe other information.

The identification device 104 also includes the appropriate hardware 112 for transmitting the data 110 to a remote device. With an RFID tag, this transmitting typically includes broadcasting the data 110 in an electronic signal that may be read with complement detection hardware on a remote device.

The computing device 102 also includes a detector 114 configured to receive a signal broadcast from the identification device 104 that includes the data 110. The precise embodiment of the detector 114 depends on the type of identification device 104 that is implemented. For instance, if the identification device 104 is an RFID tag, then the detector 114 is an RFID tag reader configured to receive signals from the RFID tag.

The computing device 102 also includes a processor 116, memory 118, a user interface component 120 and an input/output (I/O) module 122. The user interface component 120 is one or more hardware components used to convey information to a user and receive input from a user and may include a graphical display, a keypad, a mouse, a stylus, and/or the like.

The I/O module 122 includes one or more components used to convey data to and receive data from other devices, including computing devices, network interface components, the identification device 104, etc. The computing device 102 also includes other miscellaneous hardware components 124 that are typically required to carry out standard functionality of a computing device.

The memory 118 stores an operating system 126 and a user interface (UI) software component 128. The operating system 126 controls allocation and execution of computing tasks that are executed by the processor 116. The UI software component 124 contains processor-executable instructions that perform user interface functionality in concert with the UI hardware component 120.

A calendar application 130, a contacts application 132 and a persons of interest application 134 are also stored in the memory. The calendar application 130 is a software application configured to track times and dates of events scheduled by user. The calendar application 130 is also configured to track persons of interest to the user by allowing a user to include names of such persons that are scheduled to attend events listed in the calendar application 130.

The contacts application 132 is configured to store and display information associated with persons known to a user. The contacts application 132 allows the user to enter names, addresses, telephone numbers, and virtually any other data associated with individuals for which the user is interested in keeping contact information.

The calendar application 130 and the contacts application 132 may be combined into a single application. One example of a software package that includes a calendar application and a contacts application is Outlook®, which is a registered trademark of Microsoft Corporation, assignee of the present patent application.

The persons of interest application 134 is a program configured to perform many of the operations described herein, i.e. to identify persons of interest when such persons are in close proximity to a user of the computing device 102.

The term "close proximity" means that the person is near enough to the individual to facility an in-person (i.e. face-to-face) meeting between the user and the person. The definition of "close proximity" varies depending on the implementation of the identification device 104 and the detector 114. For example, if the identification device 104 requires an IR signal to operate, then a person associated with the identification device 104 would need to be within sight of a user (hereinafter "the user") of the computing device 102. If the identification device 104 is a Bluetooth compatible computing device, the person could be located outside of a line-of-sight with the user.

As used herein, the term "persons of interest" refer to persons listed in the calendar application 130 as being scheduled to attend an event listed in the calendar application 130. A "person of interest" may also be a person listed in the contacts application 132. As such, when a person listed in the calendar application 130 and/or the contacts application 132 is detected near the user, the user is notified of such a person's proximity.

The functionality of the persons of interest application 134 is described in greater detail below, with respect to subsequent figures.

The computing device 102 is configured to communicate with a remote directory server 136 via a network 138. The directory server 136 stores at least a directory 140 that includes a plurality of records 142. In the example shown, the records 142 include "Person_1" 144, "Person_2" 146, through "Person_n" 148. Each record includes information—such as name, id number, address, telephone, web sites, documents, and the like—of a person associated with the record.

As will be described in greater detail, below, the computing device 102 is configured to access the directory server 136 to obtain information on a person associated with the detected identification device 104. For example, if the data 110 stored in the memory 108 of the identification device 104 consists of only an identification number, the computing device 102 is configured to access the directory server 136 and search the records 142 for an entry that includes the identification number. Any information associated with that identification number may then be used by the persons of interest application 134.

The directory server 136 may also be used to implement security measures for identifying individuals. The information contained in a record 142 may contain security access information that is used to determine who has access to information contained in the record. In a business enterprise scenario, for example, only users who are employees or who belong to a specific group of employees may be allowed to access such information.

Additional details regarding the functionality and operation of the system 100 are described below, with reference to subsequent figures.

Exemplary Methodological Implementation

Figure 2:
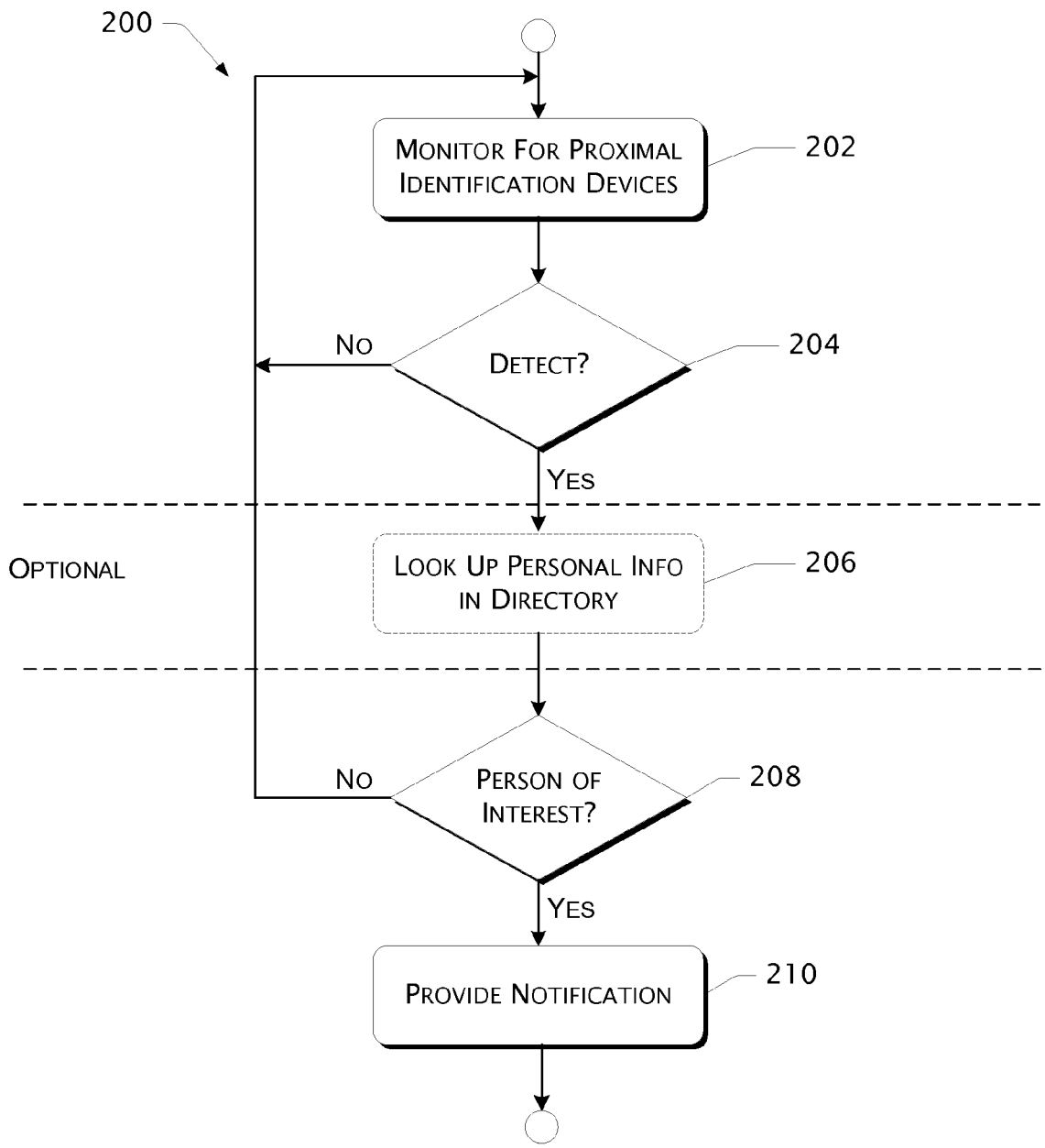
FIG. 2 is a flow diagram that depicts an exemplary methodological implementation of detecting persons of interest in proximity to a user and notifying a user thereof.

FIG. 2 is a flow diagram 200 that depicts an exemplary methodological implementation of detecting persons of interest in proximity to a user and notifying a user thereof. It is noted that the functionality depicted in the flow diagram 200 may be implemented in a method having more, fewer or different steps than those shown herein without departing from the spirit and scope of the appended claims. In the following discussion, continuing reference is made to the elements and reference numerals shown in FIG. 1.

At block 202, the computing device 102 monitors for identification devices 104 located within range of the computing device 102. As previously stated, the range within which an identification device 104 may be detected varies with the type of technology utilized for the identification device 104 and the detector 114. Generally, the detection is limited to an area within which it is practical for a user of the computing device 102 to appear in person before a person associated with an identification device 104 within a short time after detection of the identification device 104. This range, for example, may be within fifty (50) feet, within a same building, within sight of the user, etc.

The monitoring continues ("No" branch, block 204) until an identification device 104 is detected. When an identification device is detected ("Yes" branch, block 204), personal information related to a person associated with the identification device may be looked up in the directory 140 on the directory server 136 (block 206).

Some types of identification device 104 may be able to store enough information to satisfy the purposes of a specific implementation. Therefore, block 206 is an optional step. For example, if the data 110 stored in the memory 108 of the identification device 104 is a name of a person associated with the identification device 104, then that may be the only information required by the computing system 102 to determine if that person is a person of interest.

However, in most cases, the identification device will provide an identifier to the computing device 102 (such as an employee number, a user name, etc.) which, in turn, uses the identifier to locate information about a person uniquely associated with the identifier. A typical directory server 136 can store virtually unlimited information about such a person. For example, the computing device 102 may be able to determine the person's identity, contact information for the person, web sites associated with the person, work groups associated with the person, etc. This information can then be provided to a user of the computing device 102 (as described below).

At block 208, the persons of interest application 134 determines is a person associated with the identification device 104 is a person of interest. As previously discussed, such a person's identity may be obtained from the directory server 136. The calendar application 130 and/or the contacts application 132 can be interrogated to determine if the identified person is listed therein. If the person is not determined to be a person of interest ("No" branch, block 208), then the monitoring continues (block 202).

If the person is identified as a person of interest ("Yes" branch, block 208), then the persons of interest application 134 causes a notification to be provided via the user interface (120/128). This notification can take any of multiple forms known in the art and can contain many different items of information. One or more examples of such a notification are described in greater detail below, with respect to subsequent figures.

Exemplary Notification

Figure 3:
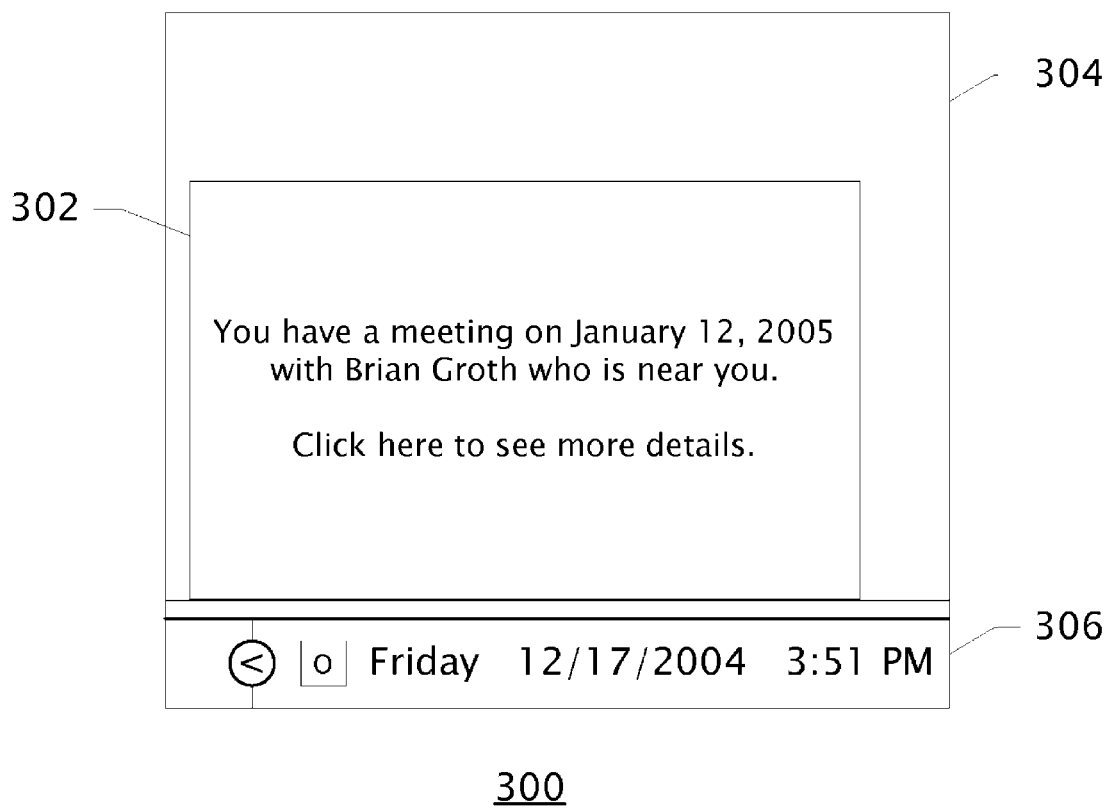
FIG. 3 is an illustration of an exemplary notification that a person of interest is located nearby.

FIG. 3 is an illustration 300 of a notification 302 to a computing device 102 user that a person of interest is located nearby. The illustration 300 shows a portion of a display screen 304 and a toolbar 306. Although it may be implemented to appear in an alternative form, the notification 302 as shown is a "toast" that pops up from the toolbar 306.

The notification 302 in the present example names the person of interest and states that the person of interest is nearby. In this example, the notification 302 indicates why the person is a person of interest, i.e. because the person is scheduled to attend a future meeting with the user. Although not shown, other information may appear in the notification 302, either in addition to the information shown in the present example or in lieu thereof.

The notification 302 is also configured to provide additional information when prompted by the user. In this example, the user is notified that additional details regarding the person of interest may be obtained by clicking on the notification. Examples of such details are described in greater detail below.

Exemplary Information Page

Figure 4:
FIG. 4 is an illustration of an exemplary information page associated with a person of interest detected in proximity to a user.

FIG. 4 is an illustration of an exemplary information page 400 associated with a person of interest detected in proximity to a user. The information page 400 appears when a user clicks on the notification 302 shown in FIG. 3. However, it is noted that one or more other implementations may be configured to provide this information in an alternative manner that is not shown here.

The exemplary information page 400 depicts types of information that can be included with a notification. For example, a name, email alias and contact information for the person of interest may be provided. In addition, portions of a schedule associated with a person of interest may be displayed.

The present example also displays contact information, personal information, occupation information and organization information. Any type of information related to the person of interest may be included in the information page 400.

The exemplary information page 400 also includes an "others" button 402 ("Who Else is Nearby?") that, when actuated, displays other individuals or persons of interest that are located near the computing device 102. Actuating the "others" button 402 causes any notifications associated with other persons of interest to be displayed. This display may be in addition to the information page 400 or in place of the information page 400.

Exemplary Information Page with Positional Information

Figure 5:
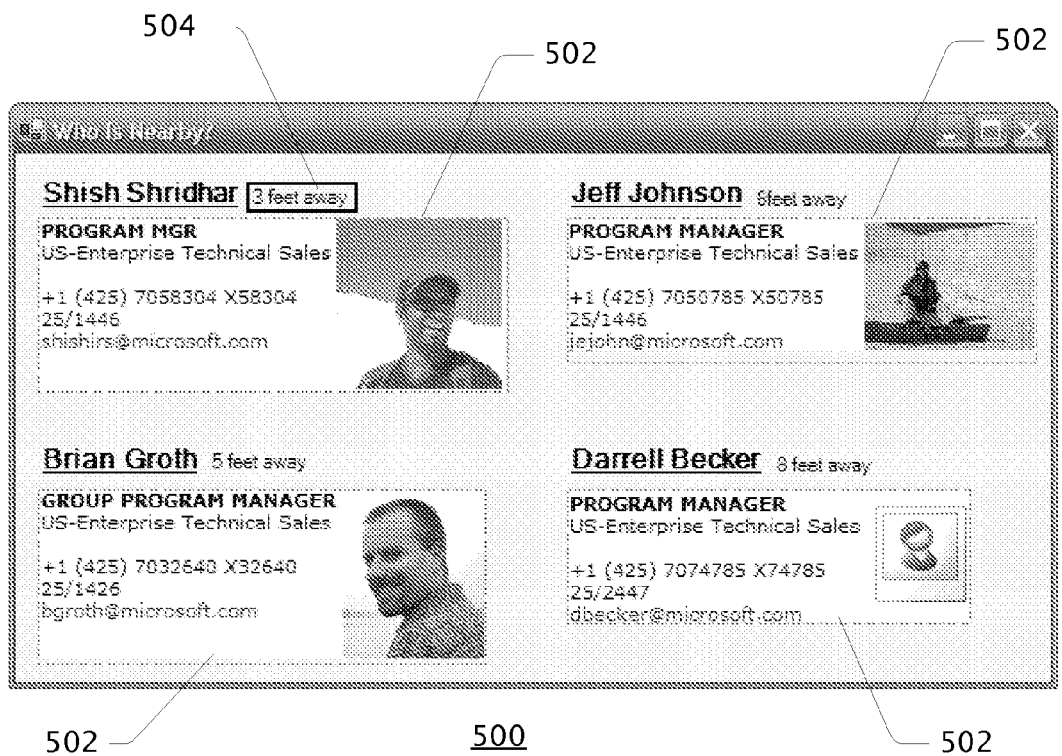
FIG. 5 is an illustration of an exemplary information page showing several persons of interest that are located in proximity to a user and showing locations of the persons of interest in relation to a user.

FIG. 5 is an illustration of an exemplary information page 500 of several persons of interest that are located in proximity to a user and showing locations of the persons of interest in relation to a user. In the present example, the information page 500 appears when the "others" button 402 is actuated on the information page 400 shown in FIG. 4.

The exemplary information page 500 includes a personal information tile 502 for each person of interest in proximity to the user. A maximum number of personal information tiles 502 may be implemented when multiple persons of interest are detected so that the information page 500 does not get too crowded with information to be practical for the user. Depending on the implementation, more or fewer than four personal information tiles 502 may be displayed at a maximum.

A personal information tile 502 may include a distance measure 504 that indicates an approximate distance that the person of interest identified in the personal information tile 502 is located from the user. The distance measure 504 may be implemented if the identification device and detection technology are configured to measure such distance in some way.

The personal information tiles 502 are positioned corresponding to locations of the persons of interest relative to the user, with the user being virtually located at a center of the exemplary information page 500. In the present example, the personal information tile associated with "Shish Shridhar" is positioned in an upper left hand portion of the information page 500. This indicates that a person of interest named Shish Shridhar is located in front and to the left of the user. Similarly, "Darrell Becker" is a person of interest located behind and to the right of the user.

To implement relative locations of persons of interest to the user, a location detection technique must be implemented.

The referenced method or any other method known in the art for identifying locations or relative locations of mobile device users may be implemented. The information supporting such location techniques may be stored on the directory server, where an active location of a mobile device is stored in a record that corresponds to a person associated with the mobile device.

Exemplary Operating Environment

Figure 6:
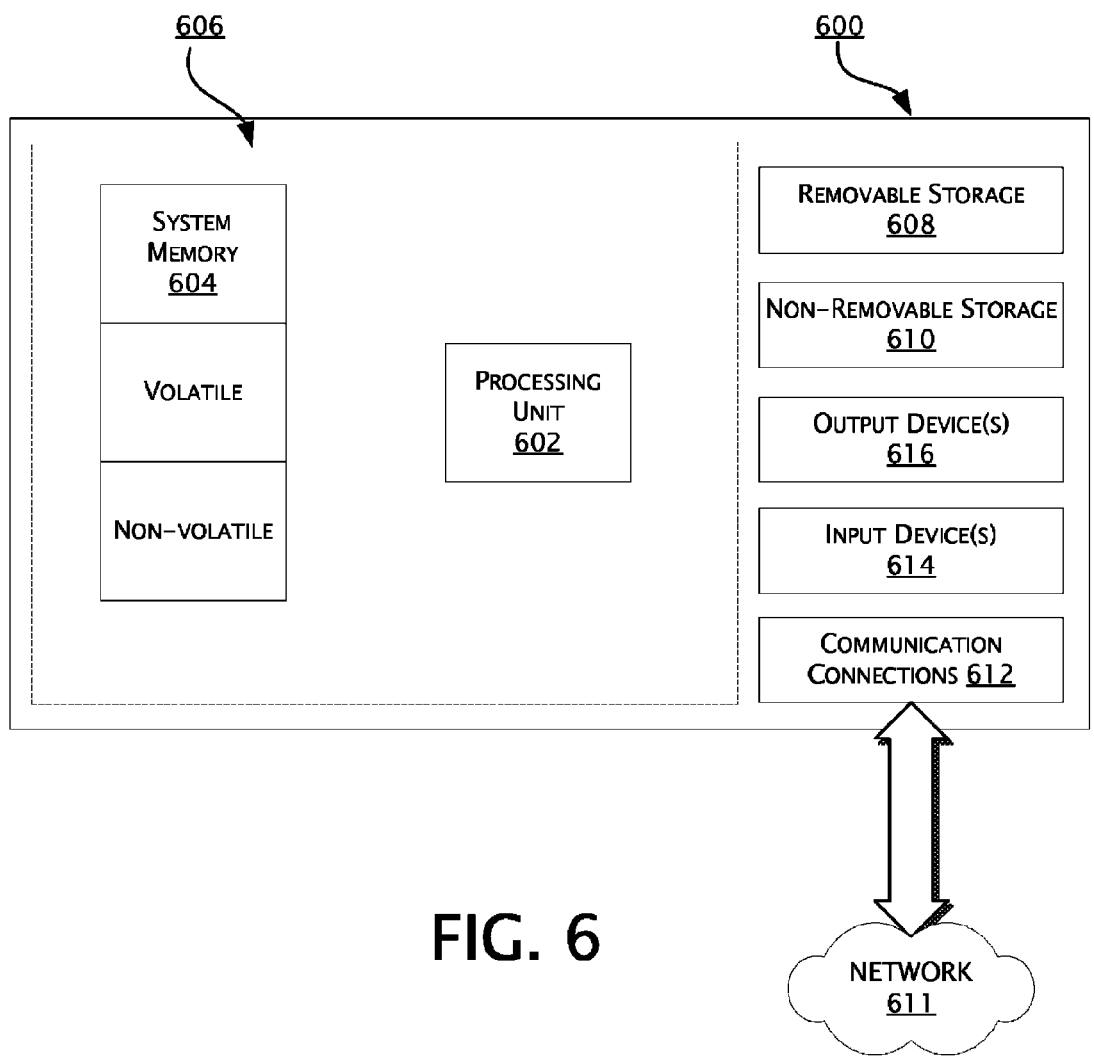
FIG. 6 is a block diagram depicting an exemplary computing environment in which the presently described techniques may be implemented.

FIG. 6 and the following discussion are intended to provide a brief, general description of a suitable computing environment in which all or a portion of the present subject matter may be implemented. The operating environment of FIG. 6 is only one example of a suitable operating environment and is not intended to suggest any limitation as to the scope of use or functionality of the operating environment. Other well known computing systems, environments, and/or configurations that may be suitable for use as described herein include, but are not limited to, personal computers, hand-held or laptop devices, multiprocessor systems, micro-processor based systems, programmable consumer electronics, network personal computers, server computers, mini computers, mainframe computers, distributed computing environments that include any of the above systems or devices, and the like.

Although not required, one or more of the present implementations will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments. In a distributed environment, program modules may be located in both local and remote computer-storage media including memory-storage devices.

With reference to FIG. 6, an exemplary system for implementing a the techniques described herein includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, device 600 may also have additional features and/or functionality. For example, device 600 may also include additional storage (e.g., removable and/or non-removable) including, but not limited to, magnetic or optical disks or tape. Such additional storage is illustrated in FIG. 6 by removable storage 608 and non-removable storage 610. Computer storage media includes volatile and non-volatile, removable and non-removable media implemented in any method or technology for storage of information such as computer readable instructions, data structures, program modules, or other data. Memory 604, removable storage 608, and non-removable storage 610 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 600. Any such computer storage media may be part of device 600.

Device 600 may also contain communication connection(s) 612 that allow the device 600 to communicate with other computing devices, such as other nodes within a computing system network 611. Communications connection(s) 612 is an example of communication media. Communication media typically embodies computer readable instructions, data structures or program modules. By way of example, and not limitation, communication media includes wired media such as a wired network or direct-wired connection, and wireless media such as acoustic, radio frequency, infrared, and other wireless media.

Device 600 may also have input device(s) 614 such as keyboard, mouse, pen, voice input device, touch input device, laser range finder, infra-red cameras, video input devices, and/or any other input device. Output device(s) 616 such as display, speakers, printer, and/or any other output device may also be included.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. While the following description is described in the foregoing context, it is not meant to be limiting as those of skill in the art will appreciate that various of the acts and operations described hereinafter may also be implemented in hardware. For example, by utilizing conventional techniques known to those skilled in the art that all, or a portion of the software instructions may be carried out by a dedicated circuit, such as a DSP, programmable logic array, or the like.

The data structures where data are maintained are physical locations of the memory that have particular properties defined by the format of the data. Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network).

Conclusion

While exemplary implementations and applications of the code module initialization have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

I claim:

1. A method for notifying of a person of interest, comprising:
   detecting by a computing device an identification device located within an area;
   receiving at the computing device from the identification device an identification of a person associated with the identification device;
   sending the identification of the person associated with the identification device from the computing device to a server;
   in response to the sending of the identification, receiving at the computing device from the server, information about the person associated with the identification device;
   searching by the computing device information associated with an application stored on the computing device to determine based on the received information if the person associated with the identification device is listed in the searched information;
   determining by the computing device that the person associated with the identification device is the person of interest when the searching results in the determining that the person associated with the identification device is listed in the searched information; and
   presenting by the computing device a notification to a user, the notification notifying the user that the person of interest is located in the area.

2. The method according to claim 1, wherein the receiving at the computing device from the server information further comprises:
   locating a record in the server that is associated with the identification device; and
   reading identification data that identifies the person from the record in the server.

3. The method according to claim 1, wherein the determining by the computing device that the person associated with the identification device is the person of interest comprises:
   determining that the person identified in the received information is listed in the searched information as being scheduled to attend an upcoming event, the application comprising a user calendar application.

4. The method according to claim 1, wherein the area further comprises a same building in which the user is located.

5. The method according to claim 1, further comprising accessing a web site associated with the person if the person is a person of interest, the web site including one or more of the following: personal information related to the person of interest; information related to the work of the person of interest; documents related to the person of interest.

6. The method of claim 1, further comprising:
   receiving by the computing device input from the user via a prompt included in the notification; and
   responsive to receiving input via the prompt, presenting by the computing device an information page including information received from the server related to the person of interest.

7. The method of claim 6, wherein the information page includes another prompt configured to receive input from the user to request information related to one or more other people of interest located within the area.

8. One or more computer storage media having executable instructions stored thereon that, when executed on one or more processors, configure the one or more processors to implement the following steps:
   receiving a signal from a device associated with a person indicating that the device is located within a certain range of a user;
   receiving an identification of the person with whom the device is associated;
   sending the identification of the person with whom the device is associated to a remote directory;
   in response to the sending, receiving information from the remote directory, the information comprising information about the person with whom the device is associated;
   searching information associated with an application stored on the one or more processors to determine based on the received information if the person with whom the device is associated is listed in the searched information; and
   determining that the person with whom the device is associated is a person of interest if the searching results in determining that the person with whom the device is associated is listed in the searched information.

9. The one or more computer storage media as recited in claim 8, wherein the certain range further comprises fifty (50) feet.

10. The one or more computer storage media as recited in claim 8, wherein the certain range further comprises a same room in which the user is situated.

11. The one or more computer storage media as recited in claim 8, wherein the certain range further comprises a same building in which the user is situated.

12. The one or more computer storage media as recited in claim 8, wherein the device further comprises one of the following devices: a powered Radio Frequency Identification (RFID) tag; a Bluetooth-compatible electronic device; an electronic device configured to transmit infrared (IR) signals.

13. The one or more computer storage media as recited in claim 8, wherein determining that the person with whom the device is associated is a person of interest comprises determining that the person identified in the received-information is listed in the stored information as being scheduled to attend a future event with the user, the application comprising a calendar application of the user.

14. The one or more computer storage media as recited in claim 8, wherein the identification of the person with whom the device is associated comprises a device identifier of the device, the remote directory is configured to store information that relates persons with devices, and the information comprises information about a person that is associated with the device having the device identifier.

15. The one or more computer storage media as recited in claim 8, further comprising providing a notification that the person of interest is located within the certain range of the user, wherein the notification comprises an approximate position of the person of interest relative to the user.

16. A system, comprising:
a processor; and
a memory communicatively coupled to the processor when the system is operational, the memory having stored thereon instructions that, when executed on the processor, cause the system to at least:
  detect a remote identification device;
  identify a person associated with the remote identification device;
  receive from a directory, information in response to the identification of the person associated with the remote identification device, the information comprising information about the person associated with the remote identification device;
  search information associated with an application stored on the system to determine based on the received information if the person associated with the remote identification device is listed in the searched information; and
  determine that the person associated with the identification device is the person of interest when the search results in the determination that the person associated with the remote identification device is listed in the searched information.

17. The system as recited in claim 16, wherein:
a person of interest further comprises a person scheduled to attend an upcoming event with a user of the system.

18. The system as recited in claim 16, wherein the identify a person further comprises identifying the person's name stored on the remote identification device.

19. The method of claim 1, wherein the notifying the user that the person of interest is located in the area further comprises an indication of a future event.

20. The method of claim 1, wherein determining by the computing device that the person associated with the identification device is the person of interest further comprises:
determining that a future event can take place at any time that the user and the person associated with the identification device happen to be near each other.

21. The method of claim 1, further comprising:
notifying the user by the computing that the person associated with the identification device is scheduled to attend a future event with the user, the future event particularly identified as a scheduled meeting, the scheduled meeting including an indication that the meeting can take place at any time that the meeting participants happen to be near each other.

22. The method of claim 21, wherein the meeting participants are in close proximity.

23. The system of claim 16 further comprising instructions that, when executed on the processor, cause the system to at least:
notify a user when the person of interest is in proximity to the user;
receive a request from the user to obtain more information about the person of interest and, in response to receiving the request, present an information page containing information received from the directory server related to the person of interest.

24. The system of claim 23, wherein the information page is configured to receive a request from the user to identify one or more other people of interest in proximity to the user.

* * * * *